(12) United States Patent
Allen et al.

(10) Patent No.: US 7,050,120 B2
(45) Date of Patent: May 23, 2006

(54) DISPLAY DEVICE WITH COOPERATIVE COLOR FILTERS

(75) Inventors: William J. Allen, Corvalli, OR (US); Winthrop D. Childers, San Diego, CA (US); Clement C. Lo, Lake Oswego, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 10/062,644

(22) Filed: Jan. 31, 2002

(65) Prior Publication Data

US 2003/0142241 A1    Jul. 31, 2003

(51) Int. Cl.
*H04N 9/12* (2006.01)

(52) U.S. Cl. ........................ 348/742; 359/634
(58) Field of Classification Search ........ 348/742–744, 348/752; 353/84, 31, 20
See application file for complete search history.

(56) References Cited

U.S. PATENT DOCUMENTS

| | | | |
|---|---|---|---|
| 4,704,660 A * | 11/1987 | Robbins | 362/552 |
| 5,103,301 A * | 4/1992 | Cosentino | 348/217.1 |
| 5,650,832 A | 7/1997 | Poradish et al. | |
| 5,731,823 A | 3/1998 | Miller et al. | |
| 5,863,125 A * | 1/1999 | Doany | 353/84 |
| 5,921,650 A | 7/1999 | Doany et al. | |
| 6,224,216 B1 * | 5/2001 | Parker et al. | 353/31 |
| 6,334,685 B1 | 1/2002 | Slobodin | |
| 6,359,662 B1 * | 3/2002 | Walker | 348/743 |
| 6,419,365 B1 * | 7/2002 | Potekev et al. | 353/98 |
| 6,467,910 B1 * | 10/2002 | Sato | 353/84 |
| 6,591,022 B1 * | 7/2003 | Dewald | 382/274 |
| 6,690,438 B1 * | 2/2004 | Sekiguchi | 349/114 |
| 6,755,554 B1 * | 6/2004 | Ohmae et al. | 362/293 |
| 6,813,087 B1 * | 11/2004 | Davis | 359/634 |
| 2001/0055081 A1 | 12/2001 | Shigeta | |
| 2002/0005829 A1 | 1/2002 | Ouchi | |
| 2002/0109821 A1 | 8/2002 | Huibers et al. | |

FOREIGN PATENT DOCUMENTS

WO    WO 02/085009    10/2002

* cited by examiner

*Primary Examiner*—Paulos M. Natnael

(57) ABSTRACT

The present invention relates to a display device that includes an illumination source configured to direct light along an optical path, a first color filter having a first number of color regions, and a second color filter having a second number of color regions, the first and second color filters being configured so as to cooperate in sequentially filtering the directed light to display an image.

14 Claims, 4 Drawing Sheets

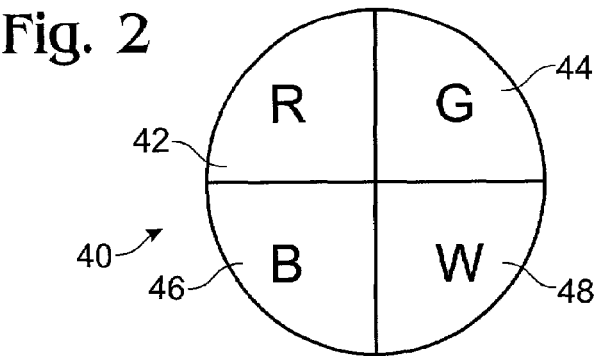
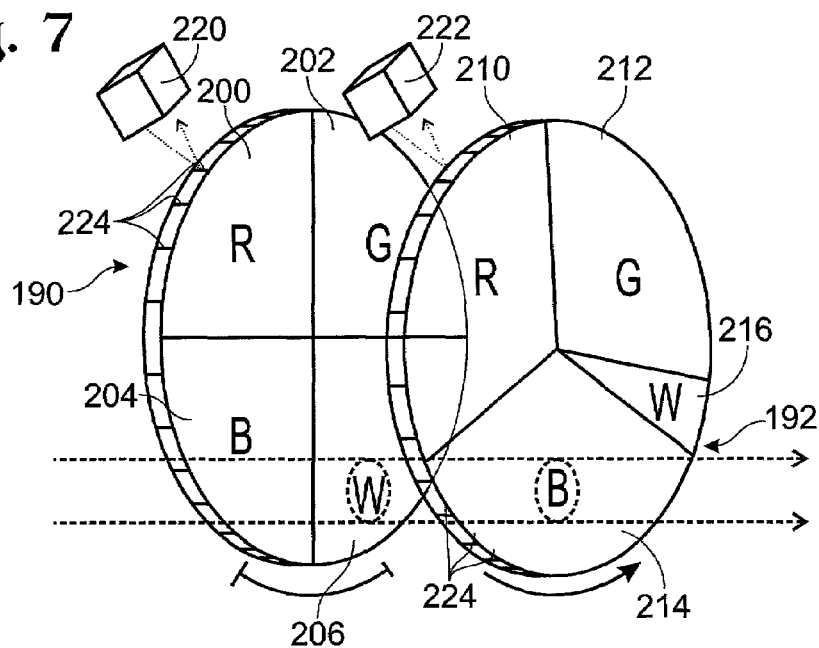
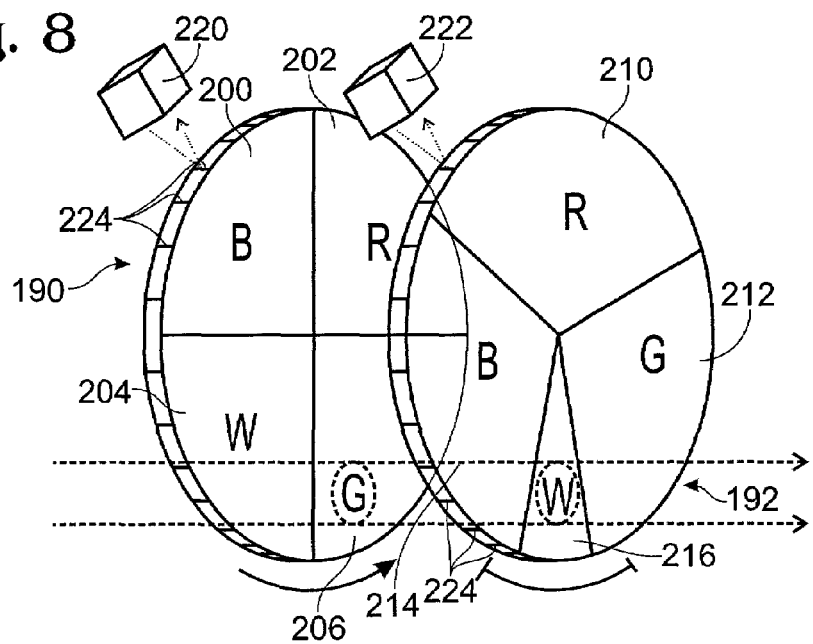

DISPLAY DEVICE WITH COOPERATIVE COLOR FILTERS

BACKGROUND

Various techniques for displaying images, both graphical images and video images, exist. One such approach is accomplished with the use of digital projectors. Typically, such projectors are configured to have a fixed gamut. In this context, gamut refers to an available spectrum of colors. For such fixed-gamut projectors, it is typical to have a gamut that is either better suited for displaying graphical images, or one better suited for displaying video images. In this respect, a gamut for displaying graphical images typically includes more brightness (e.g. a better white point) at the expense of chroma, or color intensity. Conversely, a gamut for displaying video images typically includes more chroma at the expense of brightness.

Using a single fixed gamut projector to display both graphical images and video images thus may result in a reduction in the quality of one type of image, or may result in a reduction of quality of both types of images. Therefore, multiple fixed gamut projectors have sometimes been employed to achieve high quality display of both graphical and video images. However, purchasing multiple fixed gamut projectors is undesirable as such projectors are typically expensive. Furthermore, even with multiple fixed gamut projectors, quality of mixed media images (e.g. graphical images and video images together) may suffer.

SUMMARY OF THE INVENTION

The present invention relates to a display device that includes an illumination source configured to direct light along an optical path, a first color filter having a first number of color regions, and a second color filter having a second number of color regions, the first and second color filters being configured so as to cooperate in sequentially filtering the directed light to display an image.

DESCRIPTION OF THE FIGURES

FIG. 2 is a plan view of an alternative fixed gamut color wheel configured to display graphical images.

FIG. 7 is an isometric view of a dynamic gamut color wheel pair configured to display video images.

FIG. 8 is an isometric view of the color wheel pair of FIG. 7, but configured to display graphical images.

DETAILED DESCRIPTION OF THE INVENTION

Figure 1:
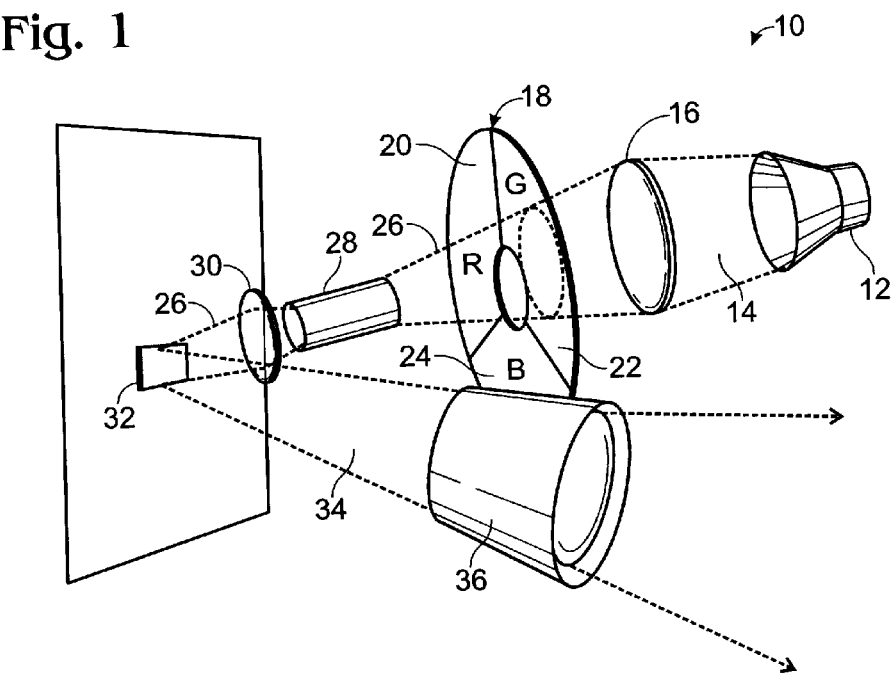
FIG. 1 is a somewhat schematic isometric view of a display system having a fixed gamut color wheel configured to display video images.

FIG. 1 illustrates, at 10, a display system employing a color filter in the form of a single color wheel 18 that may be used to display images (graphical or video). As indicated, the depicted display system may further employ an illumination source 12 configured to direct light 14 along an optical path toward color wheel 18. In the depicted display system, light from the illumination source impinges on a separate condensing lens 16, and then on color wheel 18. It will be appreciated, however, that illumination source 12 may instead include optics such as lens 16. It also will be appreciated that illumination source 12 may take the form of a high pressure mercury lamp, but the present invention is not so-limited.

Although not specifically shown, color wheel 18 may be mounted on a shaft which, in turn, may be operated on by a motor or some other drive mechanism capable of rotating the color wheel rapidly, typically on the order of several thousand revolutions per minute (rpm). Color wheel 18 defines three color regions, a red region 20, a green region 22, and a blue region 24, which pass through the optical path as the color wheel rotates so as to sequentially filter light from the illumination source. The depicted color wheel typically is used to produce video images due to its better chroma (color intensity) relative other color wheels, such as the alternative color wheel discussed below with reference to FIG. 2. In this regard, color wheel 18 may be characterized as producing a "high-chroma gamut."

As indicted, upon passing through the color wheel, incident light 14 is filtered, producing colored light 26. Colored light 26 may then be passed through an integrator rod 28 which homogenizes the colored light and directs such homogenized colored light toward an illumination lens 30. Illumination lens 30, in turn, may direct the homogenized colored light onto a spatial light modulator (SLM) 32, such as a digital micro-mirror device or a digital light processor. Use and operation of such SLMs is known, and will not be discussed in detail here. Spatial light modulator 32 produces modulated colored light 34, which will be seen to pass through a projection lens 36, and then on to a display surface (not shown) for display of an image.

FIG. 2 illustrates an alternative color wheel 40 that may be used in display system 10. Color wheel 40, it will be noted, defines a red region 42, a green region 44, a blue region 46 and a white region 48. White region 48, it will be understood, may actually be clear so as to provide for passage of white light therethrough. Color wheel 40 typically is used to produce graphical images due to its better white point (brightness) relative to color wheel 18. Chroma, it will be appreciated, is traded off for brightness in the gamut produced by color wheel 40. Thus, color wheel 40 may be characterized as producing a "high-brightness gamut."

As previously indicated, display systems such as system 10 may be considered to have a fixed gamut. In this regard, only a single range of colors (gamut) may be produced by such systems. Since high-brightness gamuts may not be particularly well-suited for displaying video images, and high-chroma gamuts may not be particularly well suited for displaying graphical images, consumers have sometimes purchased separate display systems to achieve the best quality for both types of images. However, such display systems are typically expensive, making purchase of multiple display systems undesirable.

Figure 3:
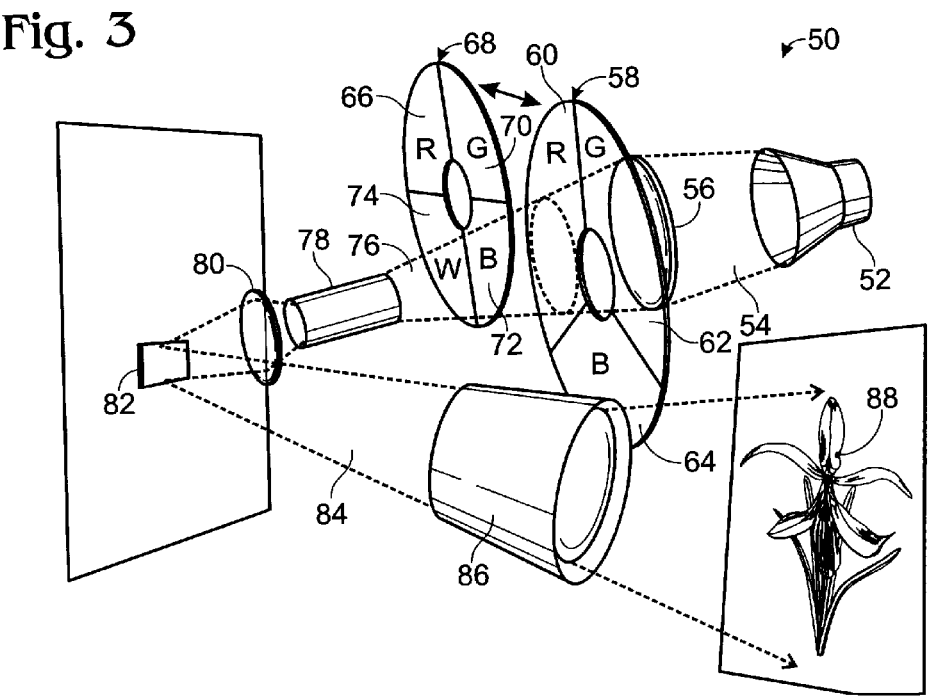
FIG. 3 is a somewhat schematic isometric view of a dynamic gamut display system according to one embodiment of the present invention.

Referring to FIG. 3, a somewhat schematic isometric view of a dynamic gamut display system according to an embodiment of the present invention is indicated generally at 50. As indicated, display system 50 includes an illumination source 52 configured to produce and direct light 54 along an optical path (indicated by dashed lines). Like the fixed gamut display system of FIG. 1, dynamic gamut display system 50 may further include a condensing lens 56, an integrator rod 78, an illumination lens 80, a spatial light modulator 82 and a projection lens 86.

As in the display system of FIG. 1, incident light 54 passes through the sequential color filter (color filter 58 in FIG. 3) to produce colored light 76. Colored light 76, in turn, may pass through integration rod 78, which homogenizes the colored light and directs such homogenized colored light toward illumination lens 80. Illumination lens 80 may then direct the homogenized colored light onto spatial light modulator 82, which produces modulated colored light 84. Modulated colored light 84 may then pass through projection lens 86, and then on to a display surface to display an image such as that shown at 88.

As indicated, display system 50 includes a first sequential color filter 58, which may be of a high-chroma configuration similar to that of color wheel 18. In this regard, color filter 58 may define a red region 60, a green region 62 and a blue region 64. Display system 50 also includes a second sequential color filter 68, which may be of a high-brightness configuration, similar to that of color wheel 40. Color filter 68 thus may be seen to define a red region 66, a green region 70, a blue region 72 and a white region 74.

As will be appreciated upon reading further, color filters 58 and 68 each may be moved in to and out of the optical path so as to selectively cooperate in sequentially filtering light 54. Thus, display system 50 may produce a dynamic gamut, either a high-chroma gamut using color filter 58 for displaying video images or a high-brightness gamut using color filter 68 for displaying graphical images. The gamut thus may be selected based on image content. Similarly, the gamut may be selected based on physical environment (e.g. ambient lighting), user preferences, etc. Although first color filter 58 and second color filter 68 take the form of color wheels, it is to be appreciated that the invention is not so limited.

Image content may be determined in a number of ways. By way of example, image content may be determined as a result of the source of the image content. In this regard, if an image is communicated to display system 50 through a video graphics array (VGA) input port (not shown), this may indicate that the image is a graphical image, and a high-brightness gamut may be selected. Alternatively, if an image to be displayed is communicated to display system 50 through a super-video (S-video) port (not shown), this may indicate that the image to be displayed is a video image, and a high-chroma gamut may be selected. In another example, image content itself may be examined to determine if video or graphical images are to be displayed. This technique may allow the display gamut to be changed, on the fly, based on image content currently being displayed.

Figure 4:
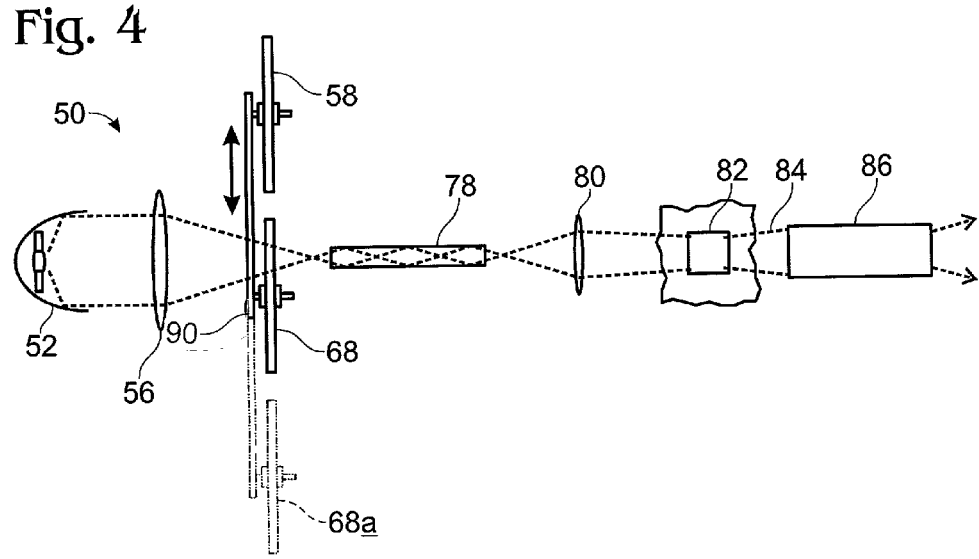
FIG. 4 is a somewhat schematic top view of the dynamic gamut display system shown in FIG. 3.

Referring now particularly to FIG. 4, display system 50 is shown from above. As indicated, display system 50, may include a carriage 90 on which color filters 58 and 68 may be rotationally mounted. Carriage 90 may be configured to selectively place either color filter 58 or color filter 68 in the optical path (indicated by dashed lines). In this regard, carriage 90 may be manually controlled, or automatically controlled based on image content, as previously described. Accordingly, color filter 68 is shown disposed within an optical path along which light from illumination source 52 is directed. At 68a, the same color filter is shown in dot-dash lines as it may be disposed when carriage 90 is moved such that color filter 58 is disposed in the optical path. Various techniques for aligning color filters 58 and 68 in the optical path exist. For example, a mechanical shuttle may be used or, alternatively, a rotational mechanism, or some other transport mechanism may be used.

Figure 5:
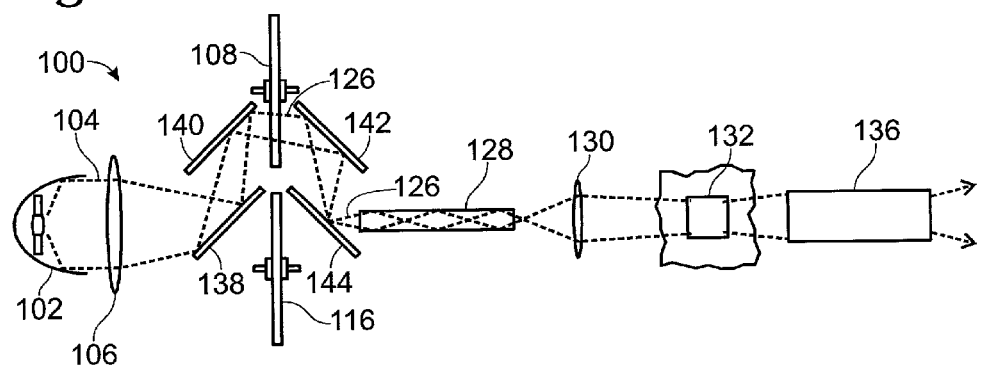
FIG. 5 is a schematic view of a dynamic gamut display system according to another embodiment of the present invention.

Referring to FIG. 5, a schematic view of an alternative embodiment display system is indicated generally at 100. Display system 100 includes an illumination source 102, a condensing lens 106, sequential color filters 108 and 116, an integrator rod 128, an illumination lens 130, a spatial light modulator 132, and a projection lens 136. These components may be of similar construction to those that have been previously described, and thus will not be discussed in detail here.

Display system 100, as opposed to display system 50, may employ sequential color filters 108, 116 (color wheels) which are rotatively coupled, each at a predetermined location relative to illumination source 102. Accordingly, display device 100 may employ an optical path director which selectively alters the optical path of light 104 from illumination source 102. This optical path director may include mirrors 138, 140, 142 and 144, which may themselves be moved in to or out of the optical path so as to selectively direct light toward a desired one of the color filters. Alternatively, prisms or other optical devices may be used.

For display system 100, incident light 104 from illumination source 102 may be conveyed through condensing lens 106. Mirror 138 may then alter the path of light 104, directing it to color filter 108, rather than through color filter 116. Mirror 140 may then direct light 104 through color filter 108 to produce colored light 126. Colored light 126 may then be directed, by mirror 142, to mirror 144, which may, in turn, direct the colored light to integrator rod 128. Upon moving mirrors 138 and 144 from the optical path, light may be directed through color filter 116. The optical path of light from illumination source 102 thus may be selectively altered depending on the content of an image to be displayed (e.g. graphical or video image) as has been previously discussed.

Figure 6:
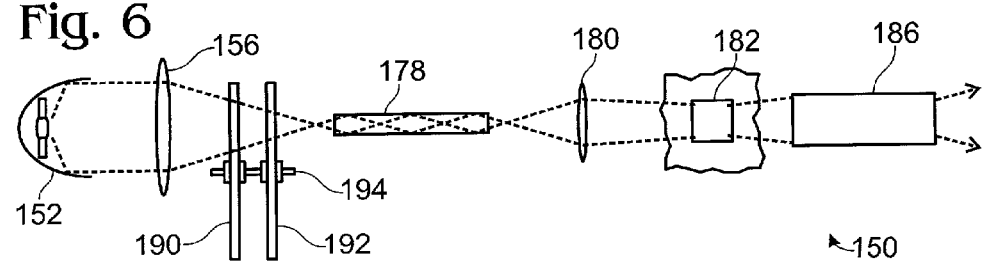
FIG. 6 is a schematic view of dynamic gamut display system according to graphical another embodiment of the present invention.

FIG. 6 is a schematic view of a dynamic gamut display system according to yet another embodiment of the present invention, the display system being indicated generally at 150. As shown, display system 150 includes an illumination source 152, a condensing lens 156, sequential color filters 190 and 192, an integrator rod 178, an illumination lens 180, a spatial light modulator 182 and a projection lens 186, which again may be of similar construction to those that have been previously described, and thus will not be described in detail again here.

As may be seen in FIG. 6, color filters 190 and 192 may take the form of color wheels mounted within the display system such that the directed light passes through both color filters in succession. Typically, a first one of the color filters may be independently movable while the other color filter is maintained in a fixed position. In the present embodiment, where the color filters are color wheels, the color wheels are coaxially rotationally mounted on an axle 194. Alternatively, the color wheels may be configured such that the color wheels rotate together in a fixed angular orientation with respect to each other. It will be understood that various configurations of color regions may be used on color filters 190 and 192. Two possible color region configurations are discussed below with regard to FIGS. 7–11.

Referring first to FIGS. 7 and 8, one possible configuration of the color regions of color filters 190 and 192 is depicted. In FIGS. 7 and 8, it will be seen that color filter 190 may be configured similarly to color filter 40. In this respect, color filter 190 may define four color regions of generally equivalent size, a red region 200, a green region 202, a blue region 204 and a white region 206. Color filter 192, in turn, may be configured so as to selectively cooperate with color filter 190 to produce a dynamic gamut to be used in displaying an image. Color filter 192 thus may define three color regions of generally equivalent size, a red region 210, a green region 212 and a blue region 214, and one relatively smaller color region, white region 216.

In FIG. 7, it will be noted that color filter 190 remains stationary while color filter 192 rotates. Incident light thus will be seen to pass through white region 206 of color filter 190, and to sequentially pass through blue region 214, red region 210, green region 212 and white region 216 of color filter 192 as color filter 192 rotates through a single revolution. Because white region 216 of color filter 192 is somewhat smaller than white region 206 of color filter 190, the gamut of the cooperative arrangement depicted in FIG. 7 has somewhat more chroma than the cooperative arrangement depicted in FIG. 8 (where color filter 192 remains stationary as color filter 190 rotates). Therefore, it will be appreciated that by alternatively fixing color filter 190, or color filter 192, the color filters may cooperate, either to produce a higher chroma gamut or a higher brightness gamut.

As may also be seen in FIGS. 7 and 8, color filters 190 and 192 may each include indicia 224 along their perimeters to accommodate accurate positioning of the color filters. It will be appreciated, of course, that indicia may similarly be included at various other locations without departing from the invention. The display system thus may further include sensors 220 and 222, as depicted in FIG. 7, which may be used to determine the position of, respectively, color filter 190 and color filter 192. Where, as here, the color filters are color wheels, the sensors may be configured to determine angular position of the color wheels.

In this respect, as shown in FIG. 7, sensor 220 may be used to control angular locking of color filter 190 in a fixed position within the display system with its white region 206 disposed within the optical path. Color filter 192 may then be rotated so as to sequentially filter light. As indicated above, such a cooperative arrangement may produce an intermediate gamut, e.g. some reduction in brightness and chroma, falling between the previously-described high-brightness gamut and high-chroma gamut. Alternatively, as is shown in FIG. 8, sensor 222 may be used to control angular locking of color filter 192 in a fixed position within the display system with its white region 216 disposed within the optical path. In this situation, color filter 190 may rotate to produce a high-brightness gamut, in a manner similar to that discussed above. Accordingly, color filters 190 and 192 may cooperate in a single display system to improve the overall quality of images displayed by such system as multiple gamuts are available for displaying different image content.

Figure 9:
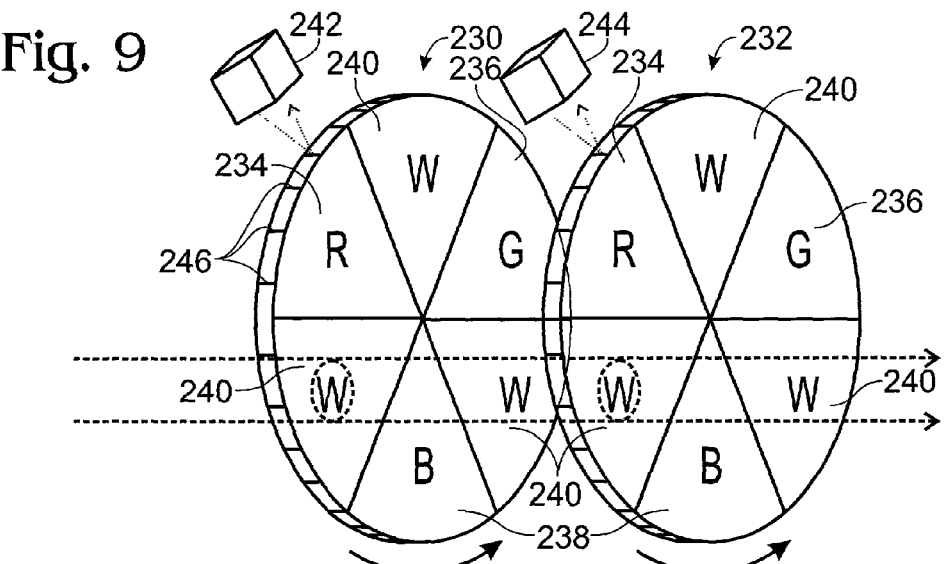
FIG. 9 is an isometric view of an alternative dynamic gamut color wheel pair configured to display graphical images.
Figure 10:
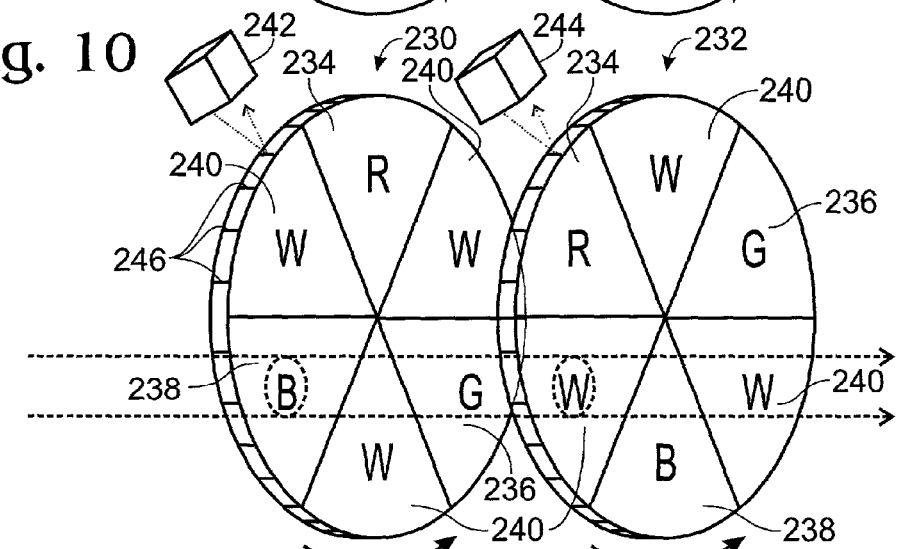
FIG. 10 is an isometric view of the color wheel pair of FIG. 9, but configured to display video images.
Figure 11:
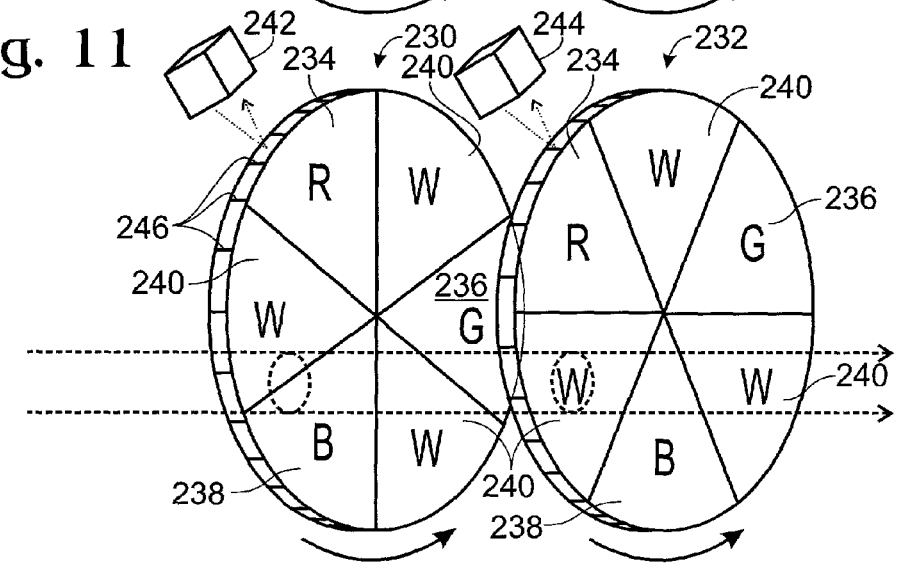
FIG. 11 is an isometric view of the color wheel pair of FIG. 9, but configured to display images with a gamut intermediate the gamuts of FIGS. 9 and 10.

Referring to FIGS. 9–11, an alternative configuration of color filters is depicted as color wheels 230 and 232. As is shown in FIG. 9, color wheels 230 and 232 are similar, each typically including six color regions of approximately equivalent size. Each color wheel thus includes a red region 234, a green region 236, a blue region 238 and three white regions 240.

As indicated in FIG. 9, white regions 240 of color wheels 230 and 232 may be angularly aligned using sensors 242 and 244, respectively, along with indicia 246. Once the desired angular relationship is achieved, color wheels 230 and 232 may be fixed relative to one another, and then rotated together to collectively define a sequential color filter. In this configuration, a relatively high-brightness gamut may be produced, as compared even to the high-brightness gamut produced with color filter 40. A higher brightness (white point) may be achieved with the configuration illustrated in FIG. 9, it will be noted, because approximately one-half of the surface area of aligned color wheels 230 and 232 is white, as compared with one-quarter of the surface area of color filter 40.

In FIG. 10, white regions 240 of color wheel 230 are aligned with red region 234, green region 236 and blue region 238 of color wheel 232. The converse is also true. Again, sensors 242 and 244 may determine the angular orientation of color wheels 230 and 232, respectively. Color wheels 230 and 232 may then be angularly locked relative to one another, and rotated together. In this configuration, the color wheels collectively define a sequential color filter configured to produce a high-chroma gamut. Such a gamut may be comparable to the high-chroma gamut produced with color filter 18, as no white or color regions remain unaligned with a corresponding red, green or blue color regions on the other color wheel.

FIG. 11 depicts color wheels 230 and 232 in an alignment intermediate to the configurations depicted in FIGS. 9 and 10. In this regard, white regions 240 of each color wheel are oriented so as to only partially overlap with white regions 240 of the other color wheel. It will be appreciated that the amount of overlap may be varied, which may allow a large number of gamuts with a wide range of chroma and brightness characteristics to be produced. As was previously discussed, sensors 242 and 244 may be used to establish a desired angular relationship between color wheels 230 and 232 for producing a desired gamut. Such a configuration may allow for small modifications in chroma or brightness based on image content, ambient light or a variety of other factors.

While the present invention has been particularly shown and described with reference to the foregoing preferred embodiments, those skilled in the art will appreciate that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

We claim:

1. A display device comprising:
   an illumination source configured to direct light along an optical path;
   a first color filter having a first number of color regions; and a second color filter having a second number of color regions;

wherein the first and second color filters are disposed on a carriage, the carriage being configured to selectively position either the first color filter or the second color filter in the optical path such that either the first color filter or the second color filter is alternatively selected to sequentially filter the directed light to display an image.

2. A display device comprising:

an illumination source configured to direct light along an optical path;

a first color filter having a first number of color regions;

a second color filter having a second number of color regions; and an optical path director configured to selectively direct the optical path through either the first color filter or the second color filter path such that either the first color filter or the second color filter is alternatively selected to sequentially filter the directed light to display an image.

3. A display device comprising:

an illumination source configured to direct light along an optical path;

a first color filter having a first number of color regions; and a second color filter having a second number of color regions;

wherein the first and second color filters are coaxially coupled first and second color wheels disposed along a single optical path, are relatively adjustable to be selectively fixed in one of plural specified angular alignments relative to each other, and are rotatable together to sequentially filter the directed light to display an image.

4. The display device of claim 3, wherein the color regions of the first color filter include a red region, a green region and a blue region.

5. The display device of claim 4, wherein the red region, the green region and the blue region are of approximately equivalent size.

6. The display device of claim 4, wherein the color regions of the second color filter include a red region, a blue region, a green region and a white region.

7. The display device of claim 6, wherein the red region, the green region, the blue region and the white region are of approximately equivalent size.

8. The display device of claim 3, wherein the color regions of the first color wheel include a red region, a green region and a blue region of approximately equivalent size, and wherein the color regions of the second color wheel include a red region, a green region and a blue region of approximately equivalent size and a white region of relatively smaller size.

9. The display device of claim 3, wherein the second color wheel is selectively fixed in a predetermined angular position while the first color wheel rotates to sequentially filter the directed light.

10. The display device of claim 3, wherein the color regions of the first and second color wheels each include a red region, a green region and a blue region, each separated by a white region.

11. The display device of claim 10, wherein the first and second color wheels are selectively fixable in one of plural specified angular alignments relative to each other and are rotatable together to sequentially filter the directed light.

12. A display device comprising:

an illumination source configured to direct light along an optical path;

a first color filter wheel having a first number of color regions;

a second color filter wheel having a second number of color regions, the second color filter wheel being coaxially coupled with the first color filter wheel, disposed along a single optical path with the first color filter wheel, and relatively adjustable to the first color filter wheel; and one or more sensors configured to sense respective first and second angular orientations to determine angular relationship between the first and second color filter wheels;

wherein the color filter wheels selectively cooperate in sequentially filtering the directed light to display an image.

13. A display device comprising:

an illumination source configured to direct light along an optical path;

a first color filter wheel having a first number of color regions; and a second color filter wheel having a second number of color regions;

wherein the first and second color filter wheels are coaxially coupled, disposed along a single optical path and relatively adjustable so as to selectively cooperate in sequentially filtering the directed light to display an image; and wherein the specified angular alignment is dependent on one or more of image content, environment and user input.

14. A sequential color filter system for filtering light directed along an optical path, the sequential color filter system comprising:

a first color wheel having a plurality of color regions; and a second color wheel having a plurality of color regions including at least one white region, wherein the second color wheel is coaxially coupled with the first color wheel and is selectively rotationally fixed with the white region in the optical path while the first color wheel rotates to sequentially filter the directed light;

each of the first and second color wheels being individually selectable to sequentially filter the light directed along the optical path.

* * * * *